Sept. 8, 1953 P. B. CARWILE 2,651,148
ULTRASONIC VIBRATORY DEVICE
Filed Nov. 23, 1949 2 Sheets-Sheet 2
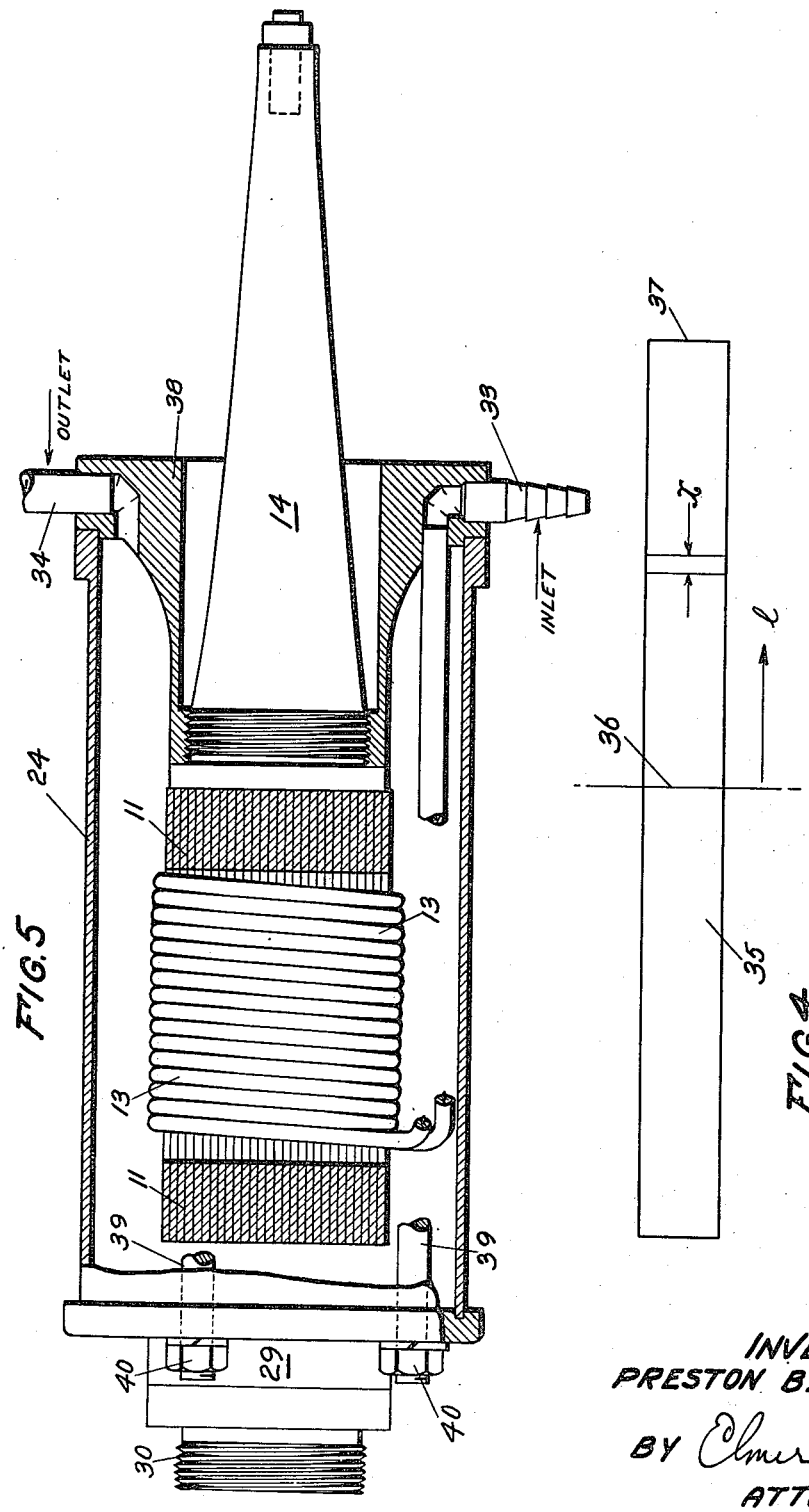
INVENTOR
PRESTON B. CARWILE
BY Elmer J. Gorn
ATTORNEY Patented Sept. 8, 1953

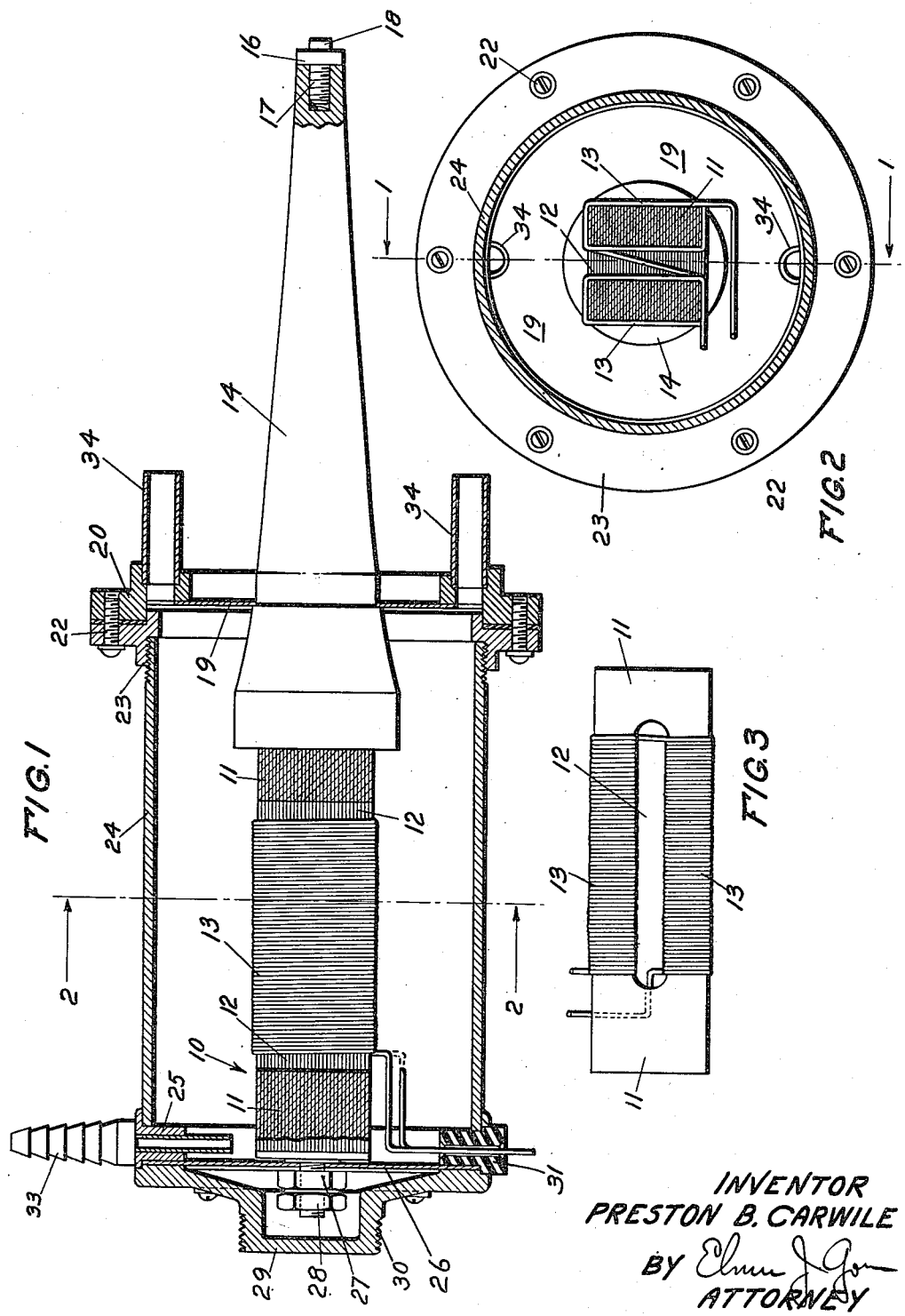

2,651,148

UNITED STATES PATENT OFFICE 2,651,148

ULTRASONIC VIBRATORY DEVICE

Preston B. Carwile, Cambridge, Mass., assignor to Raytheon Manufacturing Company, Newton, Mass., a corporation of Delaware Application November 23, 1949, Serial No. 128,989

10 Claims. (Cl. 51—59)

This application relates to electromechanical oscillatory devices, and more particularly to ultrasonic oscillators which may be used for drilling holes of regular or complex shapes in hard materials, for bonding plastics and other material by localized heating, for grinding, cutting, polishing, the subjecting of fluids to intense waves, intense agitation, impregnation, biological treatments, bacterial treatment, treatment of mixtures, testing of materials, and other operations where intense vibration is useful.

The type of oscillator, which is generally used for developing high-power mechanical oscillations of relatively high frequency, is based on the well-known magnetostriction effect found in many materials to a limited degree. Useful amplitudes of this effect may be produced in only a few materials, the most common of which are nickel and nickel alloys. The operating frequency of a magnetostrictive oscillator is inversely proportional to the length of the magnetostrictive core in which standing wave oscillations are set up. At low audio frequencies, for example, below 10,000 cycles, the magnetostrictive core is sufficiently long that oscillations may be set up therein of a large enough amplitude to be useful for percussion abrading or drilling of materials. The amplitude of these oscillations which are in the form of longitudinal expansions and contactions of the core is believed to be on the order of .0005″.

It has been discovered that, as the frequency of the oscillations is increased, the rate of drilling for a given amplitude will increase. The exact reason for this increase is not known with certainty but one explanation thereof is as follows. When the drill tool is pressed against a hard surface, such as glass, with a suitable abrasive material placed between the drill tool and the glass, rapid percussions of the tool on the glass cause the abrasive material to tear away small particles of the glass. The amount torn away per stroke will, in general, vary as a function of the velocity at which the tool strikes the glass. If this velocity, which corresponds to the product of amplitude and the frequency of the oscillations, is made constant, and the oscillation frequency is increased, the number of strokes per unit time of the tool on the work increases, thereby increasing the rate of cutting of the glass by the tool. If, on the other hand, the frequency is held constant and the velocity is increased, the rate of cutting is steeply increased. These relationships will be discussed in more detail presently.

When magnetostrictive cores are used as a source of mechanical oscillations at frequencies in the upper sonic and ultrasonic bands, sufficient amplitude cannot be achieved in the magnetostrictive core to produce effective drilling at a practicable speed. This results from the fact that the physical properties of the core, particularly its elastic strain limit, set an upper working limit to the amplitude of oscillatory movement which may be developed.

The present invention relates to a structure whereby oscillations, generated by a high-frequency, limited-amplitude magnetostrictive oscillator, may be changed mechanically to transcend this amplitude limit. The structure for transcending the amplitude of the oscillations comprises a tapered horn having suitable physical properties to be discussed presently and having its large end attached to one end of the magnetostrictive core. As the tapered horn extends away from the magnetostrictive core, its cross-sectional area is gradually reduced. This results in an increase in the amplitude of the compressional wave oscillations as they travel down the tapered member, the physical properties of the horn material being such as to permit an amplitude transcending the limit in the core.

In addition, pursuant to the present invention, it has been discovered that, if the joint between the magnetostrictive core and the tapered member be made substantially an anti-node, mechanical stresses at this joint will be reduced to a minimum, thereby reducing probability of failure of the joint.

A further species of the invention has been devised wherein the oscillatory structure is supported at or near an anti-node by a substantially resonant support structure.

The present invention also provides a support structure for the oscillatory device which comprises a diaphragm attached to the device substantially at a node, thereby reducing losses in the device due to oscillations which might otherwise be fed into the support structure.

Other and further objects of this invention will be apparent as the description thereof progresses, reference being had to the accompanying drawings wherein:

Fig. 1 illustrates a longitudinal cross-sectional view of a drilling device embodying applicant's invention taken along line 1—1 of Fig. 2;

Fig. 2 illustrates a transverse cross-sectional view of the device shown in Fig. 1 taken along line 2—2 of Fig. 1;

Fig. 3 illustrates a detailed view of the core structure;

Fig. 4 is a simplified diagram illustrating the mechanics of resonant mechanical oscillations; and Fig. 5 is a partially broken-away longitudinal sectional view of a modification of the device shown in Fig. 1.

Referring now to Figs. 1 and 2, there is shown a magnetostrictive core 10 comprising a plurality of rectangular sheets of metal 11. As shown in Fig. 3, each of these sheets has a slot 12 therein coaxial with the longest axis of the sheet. Sheets 11 are assembled into a laminated stack to form a core having a common slot 12 therein, and a pair of toroidal coils 13 are wound about opposite sides of the slot 12. When these coils are connected in series with their magnetic fields aiding, a closed magnetic flux path will be set up in each sheet 11 of the core 10.

Attached to one end of the core 11 is a tapered metallic member 14 whose axis is substantially concentric with the axis of core 11. Member 14, which may be made of any material having the requisite physical properties to be discussed presently, such as, for example, Monel metal, may be attached to core 11, for example, by silver solder. Member 14 is tapered from a point adjacent its junction to core 11 to the remote end of member 14 by an exponential taper. While member 14 may be and indeed has been built and tested with other shapes of taper than an exponential curve, it is believed that the maximum amplitude increase is obtained when the percentage change of the cross-sectional area of the member is directly proportional to the change in position along the axis of member 14. The exact point where the taper starts or stops is not critical.

At the smaller end of tapered member 14 there is a tool-holding member 16, which is attached to member 14, by a stud 17, which is unitary with member 16, and engages a threaded hole in the end of member 14. Attached to member 16 as by soldering or welding is the tool 18, which may be of any desired material and of desired shape. In general, the harder and tougher the tool material, the longer the life of the tool.

When the coil 13 is energized by an electrical oscillator and a suitable magnetizing bias is applied to core 11 through coil 13 in a well-known manner, oscillations will be generated by core 11 which will set up standing compressional waves in the member 14 and the core 11. While the core 11 as shown here is substantially a half wave length long, and the tapered member is made substantially a wave length long at the resonant frequency, other multiples of one-half wave length may be used for these dimensions. The member 14 and core 11 are supported by a diaphragm 19, which may be, for example, Monel metal on the order of $\frac{1}{32}$" thick, and which is attached to tapered member 14 at approximately a quarter wave length from the junction between core 11 and member 14. Since this point is a node of the standing wave oscillations, substantially no energy will be fed into diaphragm 19. This diaphragm is of sufficient thickness to prevent substantial longitudinal movement of members 14 and 11, and is attached to a supporting ring 20 as, for example, by silver solder. The diaphragm 19 engages a small annular shoulder in the tapered surface of member 14 and is secured thereto as, for example, by soldering.

Supporting ring 20 is secured by screws 22 to a flange 23, which engages a cylinder 24, which surrounds and extends the length of core member 11. The opposite end of cylinder 24 from flange 23 is rigidly attached to an annular ring 25, for example, by soldering. Attached to annular ring 25 is a diaphragm 26, which, in turn, is attached to the end of core member 11 by a stud soldered to core 11, and a nut 27 and lock nut 28 threaded on said stud and engaging diaphragm 26. Diaphragm 26 is attached to core 11 at an anti-node, and therefore is made of very thin material, for example, monel metal, 0.010" in thickness. This diaphragm allows longitudinal movement of core 11 but prevents transverse movement thereof. Thus it may be seen that the oscillating structure comprising core member 11 and tapered member 14 is rigidly held with respect to cylinder 24 without substantial damping of the oscillations.

Bolted to ring 25 is an end plate 29 which has threaded extension 30 such that it may be attached to a standard drill press shaft in place of the conventional chuck. The wires for coils 13 extend out through a splash-tight insulating bushing 31 set in ring 25. A coolant may be admitted to the space surrounding core member 11 by an input hose connection 33, which extends through ring 25. A suitable coolant outlet, such as a hole, or, as is shown here by way of example, a plurality of holes, extends through diaphragm 19 and ring 20, and engages exhaust fittings 34, whereby the coolant may be allowed to drain from the cylinder 24. Any desired coolant may be used, such as, for example, oil or water.

A theory of this invention is as follows. Referring to Fig. 4, there is shown a straight slender rod 35 free at the ends, undergoing steady longitudinal vibration at its fundamental resonant frequency. In such cases, the maximum amplitude of vibration is at the two ends. Midway between, there will be a node 36. If $l$ be the longitudinal distance measured from the node 36 toward one end 37 of the rod, $x$ the longitudinal displacement of any transverse section of the rod from its equilibrium position, $x_0$ the amplitude of vibration at the said end, $\lambda$ the wave length of longitudinal waves in the rod, $t$ the time as reckoned from some instant when the displacement $x$ at end C is zero but is increasing in the positive direction and T the time required for one cycle of vibration, then the following well-known equation applies for the instantaneous displacement of any transverse section.

$$x = x_0 \left[ \sin\left(2\pi\frac{l}{\lambda}\right) \right] \left[ \sin\left(2\pi\frac{t}{T}\right) \right] \quad (1)$$

If $e$ is the longitudinal strain at any transverse section (i. e. the elongation per unit length) and $e_0$ the strain amplitude at the node, the equation for $e$ at any longitudinal position and at any time may be found by partially differentiating Equation 1. The result is $$e = e_0 \left[ \cos\left(2\pi\frac{l}{\lambda}\right) \right] \left[ \sin\left(2\pi\frac{t}{T}\right) \right] \quad (2)$$

We also have the following relation between $e$ and $x$ $$x = \int_0^l e \, dl \quad (3)$$

When $t = (n+\frac{1}{4})T$ $n=0, 1, 2, 3, \ldots$ then Equations 1 and 2 reduce, respectively, to $$x = x_0 \sin\left(2\pi\frac{l}{\lambda}\right) \quad (4)$$

$$e = e_0 \cos\left(2\pi\frac{l}{\lambda}\right) \quad (5)$$

Substituting Equation 5 in Equation 3 we get $$x = e_0 \int_0^l \left[\cos\left(2\pi\frac{l}{\lambda}\right)\right] dl \quad (6)$$

At end 37, $l = \lambda/4$ and $x_1 = x_0$, and therefore substituting $x_0$ for $x$ in Equation 6 produces $$x_0 = e \int_0^{\frac{\lambda}{4}} \left[\cos\left(2\pi\frac{l}{\lambda}\right)\right] dl \quad (7)$$

$$= \frac{e_0 \lambda}{2\pi} \left[\sin\left(2\pi\frac{l}{\lambda}\right)\right]_0^{\frac{\lambda}{4}} \quad (8)$$

$$= \frac{e_0 \lambda}{2\pi} \quad (9)$$

If $c$ = velocity of longitudinal waves in the rod and $f$ = frequency, we have the wave equation $$c = f\lambda \quad (10)$$

Eliminating $\lambda$ between Equations 10 and 9, $$x_0 = \frac{e_0 c}{2\pi f} \quad (11)$$

If we let $e_m$ designate the maximum usable working strain for the rod and $x_m$ the corresponding maximum amplitude at end 37, then $$x_m = \frac{e_m c}{2\pi f} \quad (12)$$

Assuming that the maximum power $P_m$ which such a rod can transmit to a given load is proportional to the product of the number of strokes per unit time (i. e. the frequency) and the square of the maximum free velocity, viz., $$P_m = Kf(2\pi f x_0)^2 \quad (13)$$

$$= Kf\left(2\pi f \frac{e_m c}{2\pi f}\right)^2 \quad (14)$$

$$P_m = Kf(e_m c)^2 \quad (15)$$

where K is a parameter which is a function of the load impedance as related to the characteristic impedance of the rod.

Thus, as is demonstrated by Equation 12, the maximum amplitude at a fixed frequency $f$ is limited by the value of the product $e_m c$. Similarly, according to Equation 15, the maximum power which can be furnished by a given rod at a fixed frequency $f$ and with a given load is limited by the product $e_m c$ and is proportional to the square of this product.

A more detailed but tedious application of standard wave theory to a tapered rod, such as that shown as 14 in Fig. 1, leads to the conclusion that Equation 9 becomes $$x_0 = \frac{h e_m c}{2\pi} \quad (16)$$

where $h$ is a factor somewhat larger than unity. Following this change through Equations 11, 12, 13 and 14, we get in place of Equation 15 the following:

$$P_m = Kf(h e_m c)^2 \quad (17)$$

In the field of sonics and ultrasonics, there are practical limitations on the value of the frequency $f$ which may be adapted to a particular use. For example, a magnetostrictive rod vibrating at audible frequency with sufficient amplitude to do rapid drilling of hard material is disagreeable to the auditory senses of the operator and other personnel in the vicinity. Obviously, an inaudible frequency would be indicated. Also Equation 15 suggests that an ultrasonic frequency would increase the power obtainable from a given rod. However, the electric and magnetic losses become excessive if too high a frequency is used. The limitation thus imposed on the frequency and the limitation of the value of $e_m c$ for the magnetostrictive rod comprise so severe an overall restriction on the available power that the action is very slow, and such process or device is of little or no practical use in many applications.

This invention transcends such limitation by joining a second rod 14 in Fig. 1 to the primary vibrator 11, said member 14 being of such character and material that its $e_m c$ is higher than the $e_m c$ of vibrator 11, said member 14 also being so shaped that its impedance to wave motion is less in the region more remote from 11 and therefore its amplitude of vibration greater than that in member 11, the two members 11 and 14 therefore functioning conjointly so that they are capable of producing amplitudes of vibration transcending those obtainable from member 11 directly. It has been found that the rate of drilling a hole in glass at 27 kc./sec. is substantially proportional to the square of the free amplitude of vibration of such a resonant system and that such a combination of members 11 and 14 comprises a useful tool and useful method of applying vibratory power.

Obviously, the primary vibrator may vary widely both in material and form. For example, it may be a piezoelectric crystal oscillator driven by the application of an alternating electric field. Likewise the member 14 may vary widely in form and/or proportions but should have a higher $e_m c$ than member 11 and have smaller impedance than that of 11 in the region where the greater amplitude is desired. Furthermore, the junction between 11 and 14 may be other than the particular sort shown here. A hard soldered junction is desirable but the device may be operated successfully with a well-fitted threaded junction between 14 and an adapter which is silver soldered to member 11 and which may be assembled and disassembled at will. Still further, such combination is not limited to only two members. For example, member 11 may be joined to an intermediate member which in turn is joined to a third member to produce substantially the same results described heretofore, and at the same time gain the advantage of more secure bonding and better wave transmission through said bonding.

There are various ways of supporting and/or constraining the vibrating system without substantially reducing the vibratory motion. One method, described heretofore, is to support the system by a member 16 in Fig. 1 of requisite stiffness attached substantially at a node. Another method is to support the system by a member of requisite stiffness and of substantially the same resonant frequency attached substantially at an anti-node.

This is shown in Fig. 5, which illustrates a modification of the device shown in Fig. 1. In this modification, the diaphragms 19 and 26 have been eliminated, as well as the lower ring members 20 and 23. For these, there has been substituted a resonant support member 38. Member 38 is cylindrical in form, and surrounds the upper portion of member 14. Member 38 is threadedly attached to member 14 at a point near the junction of member 14 and core 11. The length of member 38 is made substantially equal to a quarter wave length of the operating frequency. Since the point of attachment of member 38 to member 14 is substantially an anti-node, and since the lower end of cylinder 38 is made quite heavy, thereby inhibiting any oscillatory movement at that point, the lower end of cylinder 38 will approximate a node. The upper end of member 38 is made relatively thin, thereby offering low impedance to the oscillatory movement of member 14. Member 38 is sufficiently strong to provide a rigid support and constraint for member 14, without substantially impeding the oscillatory motion thereof. Member 38 is attached to cylinder 24, which, in turn, is attached to upper cover 29, the assembly 38, 24 and 29 being held together by studs 39, which are threaded into member 38 and which extend through cylinder 24 and cover 29 to engage nuts 40. Apertures are provided in member 38 for the coolant inlet and outlet 33 and 34, respectively, and for lead-in wires (not shown) for coil 13. Other possible methods of support will occur to those familiar with the art of vibratory systems.

Applicant has discovered that this device is particularly useful for localized heating of materials, such as plastics, for the bonding thereof. When thin plastics are to be bonded, there are distinct advantages in using a high-frequency oscillator above the audio range. First, an unpleasant audible note which would normally irritate the operator is eliminated, and, second better matching of the oscillator to the plastic is obtained, thereby resulting in greater absorption of the mechanical energy by the plastic, with a resultant increased efficiency and speed of operation. This better matching is believed to occur due to the fact that at higher frequencies there is, for a given value of power, less energy in each stroke of the tool so that the plastic is not deformed to any great degree beyond its elastic limit. Then, when the tool is withdrawn after a stroke, the plastic will follow the tool back, thereby creating the desired kneading action which creates the heat by internal rubbing of the plastic's molecules. If a low-frequency stroke is used at the same power level, deformation of the plastic may be very marked and plastic will not follow the tool back, with a resultant lessening of heat generated by the kneading action. With an ultrasonic frequency device, it has been found that substantially less power and time is required to produce a bond between two thin plastic materials.

This completes the description of the embodiment of the invention illustrated herein. However, many modifications thereof will be apparent to persons skilled in the art. For example, other types of oscillators might be used with applicant's amplitude increasing member 14, different methods of support of the device could be used, and different contours and tapers of the device 14 may be utilized without departing from the spirit and scope of this invention. Therefore, applicant does not wish to be limited to the particular details of the species of the invention illustrated herein except as defined by the appended claims.

What is claimed is:

1. A vibratory device comprising a source of mechanical oscillations, and means for increasing the amplitude of said oscillations comprising a medium for transmitting said mechanical oscillations attached to said source, said medium having a reduced cross-sectional area as said medium extends away from said point of attachment, said medium comprising Monel metal.

2. A vibratory device comprising a source of mechanical oscillations comprising a magnetostrictive oscillator having a magnetostrictive core, and a medium for transmitting said mechanical oscillations contacting said core, said medium comprising Monel metal.

3. A vibratory device comprising a source of mechanical oscillations comprising a magnetostrictive oscillator, and means for increasing the amplitude of said oscillations comprising a Monel metal medium for transmitting said mechanical oscillations attached to said source, said medium having a reduced cross-sectional area as said medium extends away from said point of attachment.

4. A vibratory device comprising a source of mechanical oscillations comprising a magnetostrictive oscillator having a magnetostrictive core and a medium substantially resonant at the frequency of said oscillations for transmitting said oscillations contacting said core, said medium comprising Monel metal.

5. An abrading tool comprising a device for producing compressional wave energy of high frequency comprising a tapered metal medium substantially resonant at the operating frequency of said device, said medium having the small end thereof connected to a vibratory abrading element, and a magnetostrictive oscillator connected to said medium at the large end thereof, the cross-sectional area of said medium being of the same order of magnitude as the cross-sectional area of said oscillator at the point of connection of said medium to said oscillator.

6. A vibratory abrading tool comprising a device for producing compressional wave energy of high frequencies comprising an exponential horn substantially resonant at said frequencies, said horn having a small end thereof connected to a vibratory abrading element, and a magnetostrictive oscillator joining said horn at the large end thereof, the cross-sectional area of said horn being substantially equal to the cross-sectional area of said oscillator at the juncture of said oscillator with said horn.

7. A vibratory abrading tool comprising a device for producing compressional wave energy of supersonic frequencies comprising a solid metal horn, said horn having a small end thereof connected to a vibratory abrading element, a magnetostrictive transducer connected to said horn at the large end thereof, the cross-sectional area of said horn being of the same order of magnitude as the cross-sectional area of said oscillator at the point of connection of said horn to said oscillator, and means for directing cooling fluid onto said transducer.

8. A vibratory abrading tool comprising a source of mechanical oscillations comprising a magnetostrictive oscillator, means for increasing the amplitude of said oscillations comprising a medium for transmitting said mechanical oscillations attached to said oscillator, said medium comprising an elongated metallic body substantially resonant at the frequency of said oscillations and having a gradually reduced cross-sectional area as said medium extends away from said point of attachment, the cross-sectional area of said medium being of the same order of magnitude as the cross-sectional area of said oscillator at said point of attachment, and an abrading element attached to the small end of said medium.

9. A vibratory device comprising a source of mechanical oscillations comprising a magnetostrictive oscillator having a magnetostrictive core comprising nickel and a metallic tapered medium for transmitting said mechanical oscillations, the large end of said medium being attached to said core, said medium having a greater elastic limit than said core.

10. A vibratory device comprising a source of mechanical oscillations comprising a magnetostrictive oscillator having a magnetostrictive core comprising nickel, and means for increasing the amplitude of said oscillations comprising a tapered metallic medium substantially resonant at the frequency of said oscillations for transmitting said mechanical oscillations having the large end thereof attached to said source, said medium having a greater elastic limit than said core.

PRESTON B. CARWILE.

References Cited in the file of this patent

UNITED STATES PATENTS

| Number | Name | Date |
|---|---|---|
| 1,380,869 | Fay | June 7, 1921 |
| 1,966,446 | Hayes | July 17, 1934 |
| 2,044,807 | Noyes | June 23, 1936 |
| 2,222,906 | Hentzen | Nov. 26, 1940 |
| 2,403,034 | Weyandt et al. | July 2, 1946 |
| 2,407,299 | Smith | Sept. 10, 1946 |
| 2,452,211 | Rosenthal | Oct. 26, 1948 |
| 2,514,080 | Mason | July 4, 1950 |
| 2,552,139 | Bocciarelli | May 8, 1951 |
| 2,553,251 | Gutterman | May 15, 1951 |

FOREIGN PATENTS

| Number | Country | Date |
|---|---|---|
| 581,123 | Great Britain | Oct. 2, 1945 |
| 852,150 | France | Jan. 24, 1940 |